Aug. 5, 1947.  H. HOWE  2,425,036
FIRETRAY ASSEMBLY SUPPORT
Filed Feb. 28, 1945
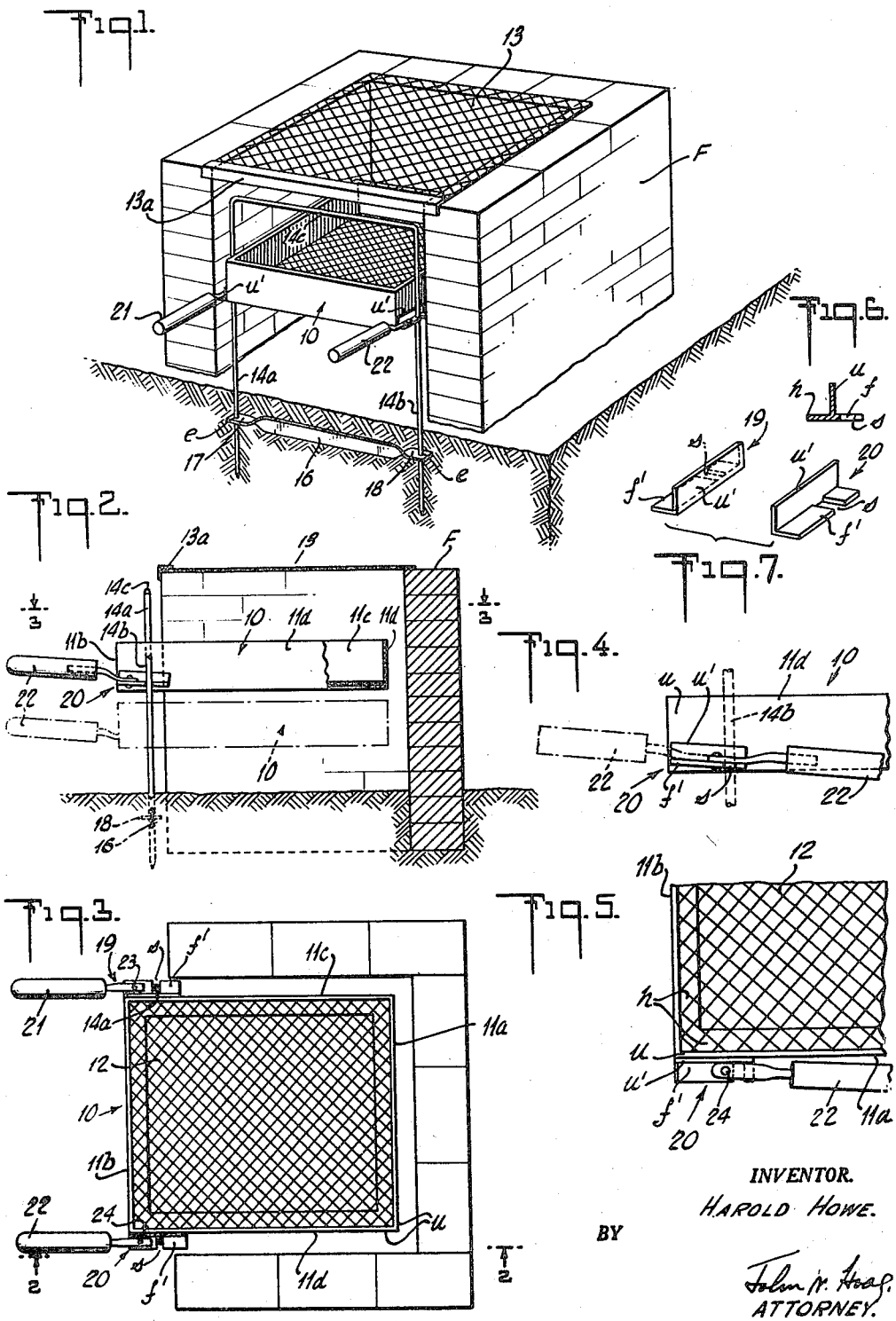
INVENTOR.
HAROLD HOWE.
BY
ATTORNEY.

Patented Aug. 5, 1947

2,425,036

UNITED STATES PATENT OFFICE 2,425,036

FIRE TRAY ASSEMBLY SUPPORT

Harold Howe, Rowayton, Conn.

Application February 28, 1945, Serial No. 580,143

5 Claims. (Cl. 248—156)

This invention relates to a fire tray and support assembly for use for example in combination with a fireplace having a fixed or stationary grill or other surface for supporting pans, kettles, broilers or the like over a fire.

An object of the invention is to provide simple and readily available means for supporting a fire tray at a desired distance below a grill or other surface for supporting kettles, pans, broilers and the like over a fire.

Another object of the invention is to provide such assembly having support means which may be readily positioned in front of a fireplace or in relation to a fixed grill and the like.

Another object of the invention is to provide a combination of fire tray and support means whereby the fire tray may be positioned at any desired height within the limits of the support means, with the fire tray substantially parallel with the grill or other surface on which the material or objects to be cooked are to be placed.

Another object of the invention is to provide support means for a fire tray which will provide a firm and dependable support in use.

Other objects of the invention will be in part obvious or in part pointed out hereinafter.

The invention accordingly consists in the features of construction, combinations of elements, arrangements of parts, and in the several steps and relation and order of each of said steps to one or more of the others thereof all as will be pointed out in the following description and the scope of the application of which will be indicated in the following claims.

The invention will best be understood if the following description is read in connection with the drawings, in which, Figure 1 is a perspective view of a fireplace with a grill top showing a fire tray assembly embodying my invention in operative relation therewith;

Figure 2 is a vertical sectional view of the structure shown in Figure 1;

Figure 3 is a plan view of the structure shown in Figure 1;

Figure 4 is a detail side view indicating the two positions of the handles of the fire tray;

Figure 5 is a fragmentary plan view of the detail shown in Figure 4;

Figure 6 is a detail view of one of the tray frame members showing it as provided with both inwardly and outwardly extending flanges; and Figure 7 is a detail view showing a modification of one of the elements of my fire tray assembly.

In the embodiment of my invention shown herein I employ means on which a fire may be built, and which is adjustable vertically with respect to the stationary grill on which the pans, kettles, etc., are supported, so that the fire may be brought closer to the grill or dropped down further from the grill as may be desired in accordance, for example, with the type of cooking—broiling, roasting, frying, etc., the size of the fire, the kind of fuel employed, the amount of wind and the like.

The movable fire support or hearth is referred to herein as a fire tray. The fire tray 10 comprises a rectangular frame 11 comprising the end members 11ª and 11ᵇ and the side members 11ᶜ and 11ᵈ. Desirably the members 11ª, 11ᵇ, 11ᶜ, and 11ᵈ are angle members, joined together in any suitable way as by welding, and arranged with an upwardly extending flange $u$ forming the perimeter of the fire tray, and the inwardly and substantially horizontally extending flange $h$, forming a supporting surface on which the fire supporting material, which desirably may be of wire net or mesh covering 12, is supported. While the fire supporting surface may, if desired, be made of non-foraminous material, such for example as sheet metal, I have found that a fairly fine mesh covering is often desirable and advantageous since it facilitates bringing an upward draft of air into contact with the fire, and serves automatically to discharge and eliminate small ash material.

The fire tray is provided with means adapted to cooperate with vertically extending support means for positioning the fire tray at any desired height between the ground surface and a stationary grill 13, illustrated herein as extending across the top of a typical, three-sided outdoor fireplace F, grill member 13 desirably being provided with a downwardly extending flange 13ª at its front end for positioning the grill on the fireplace F or other means for supporting and fixing the position of grill member 13. As illustrated herein the sides of the tray may be provided with outwardly extending flanges $f$ respectively (Figure 6), each of which is bored, or preferably provided with an outwardly opening slot $s$, to receive the vertically extending support members 14ª and 14ᵇ. Preferably the members 14ª and 14ᵇ comprise part of a U-shaped structure, the portions 14ª and 14ᵇ being spaced apart in substantially parallel relation and said members being interconnected at one end by the interconnecting or intermediate portion 14ᶜ, thus leaving one end of support members 14ª and 14ᵇ free, and these free ends may be provided with bases, or as illustrated they may be pointed to facilitate driving them into the ground, to form vertically extending supports on which the fire tray may be supported and so that its position on said supports may be varied from time to time as desired to bring the fire tray nearer to, or to remove it further from, said grill 13.

In combination with the support means I provide a spacing member 15 comprising a thin intermediate portion 16 of substantial width, and end portions 17 and 18 respectively, preferably twisted through 90° relative to portion 16, so that they extend in a plane angularly related to the portion 16, the said end portions each being provided with an eyelet e of a size to receive the support members 14$^a$ and 14$^b$. It will be understood that the distance between the eyelets e of end portions 17 and 18 will preferably substantially correspond with the distance between the slots s of the outwardly extending flanges f on the sides of the fire tray, so that member 15 may serve to maintain the desired spacing relation between support members 14$^a$ and 14$^b$, to the end that fire tray 10 may be readily moved up or down on the support members and its position thereon adjusted as may be desired.

If the ends of the support members are driven into the ground the spacing member 15 may be buried in the ground, preferably with the intermediate portion 16 arranged so that it is in a substantially vertical plane and thus tends to resist rotation of the support members 14$^a$ and 14$^b$ toward or away from the fire and grill 13, said support members 14$^a$ and 14$^b$ being threaded through eyelets 17 and 18 of the spacing member 15 to any desired extent. If desired, instead of inserting the free ends of vertical support members 14$^a$ and 14$^b$ in the ground, the intermediate portion 14$^c$ interconnecting the leg portions 14$^a$ and 14$^b$ may be employed as the base of the support means. Thus, for example, portion 14$^c$ may be inserted in the ground leaving the free ends of leg portions 14$^a$ and 14$^b$ extending upwardly. Spacing member 15 may be threaded on support members 14$^a$ and 14$^b$ and used as before, and, if portion 14$^c$ is inserted in the ground, it may be buried in the ground to give stability to the supporting means as described above.

I prefer to have the slotted means on the tray which are to engage the support members 14$^a$ and 14$^b$ somewhat angularly related with respect to the surface 12 of the fire tray so that the said surface will be substantially horizontal, or substantially parallel with the grill 13, after the fire tray has been positioned at the desired height on the said supports, and is fixed in this position, and thus achieve the advantages which will be pointed out. Thus instead of having on the sides of the fire tray, outwardly extending flanges f, extending at right angles to the upwardly extending frame portion u, as illustrated in Figure 6, I prefer to relate the flanges f so that they are inclined downwardly with respect to the main body of the fire tray and particularly surface 12, in a direction away from the front end of the tray and toward the rear end of the tray. The flanges f may be cast integrally with and in angular relation with the upwardly extending flange u of the embodiment shown in Figure 6, or slots s, for receiving the upright supports 14$^a$ and 14$^b$, may be provided in separately formed members 19 and 20 respectively (Figure 7), which desirably are angle members and each comprise the upwardly extending portion u' and the horizontally extending portion f', said members 19 and 20 joined to the sides 11$^c$ and 11$^d$ of the fire tray respectively with the upwardly extending portions u' of the members 19 and 20 in abutting relation to the upwardly extending members u of the tray sides 11$^c$ and 11$^d$. Members 19 and 20 may be secured to said members 11$^c$ and 11$^d$ in any suitable way as for example by welding, and with the flange portions f' of members 19 and 20 extending outwardly from the sides of the fire tray.

The slots s should be of a size to readily receive therein the support members 14$^a$ and 14$^b$ and at the same time provide as close a fit as is compatible with the easy handling and assembly of the parts, and will permit the fire tray to be moved freely upwardly and downwardly along the support members 14$^a$ and 14$^b$ to position the fire tray at whatever height, between the base or ground and the grill 13, is desired. It will be noted that the slots s are positioned to the rear of a median line extending between the front and rear edges of the fire tray, and accordingly the fire tray, after it has been positioned at the desired height on the supporting members 14$^a$ and 14$^b$, with said members in the said slots s respectively, will tend to rotate forwardly and thus cause the front and rear edges of slots s to frictionally engage the support members 14$^a$ and 14$^b$ respectively, thereby holding the fire tray in place. The fire tray will tend to rotate relative to the support members to an extent determined by the play between the supporting members 14$^a$ and 14$^b$ and the slots s respectively. In other words, if the width of the slots s and the diameter of the members 14$^a$ and 14$^b$, is substantially the same, the extent of rotation of the fire tray in arriving at a position where it is firmly and frictionally engaged upon said support members 14$^a$, and 14$^b$, will be more limited than if there is a greater difference between the width of the slots s and the diameters or thickness of said members 14$^a$ and 14$^b$. By arranging the flanges containing slots s, as for example the members 19 and 20, in angular relation to the sides 11$^c$ and 11$^d$ of the fire tray and inclined downwardly from front to rear with respect thereto, the extent of the angular relation being determined in relation to the extent of the tolerance between the members 14$^a$ and 14$^b$ and the slots s, I am able to cause the fire tray to be in a substantially horizontal plane after it has become frictionally engaged on the support members 14$^a$ and 14$^b$, and thus a suitable, level surface is provided to receive and support the fuel for the fire.

In order to facilitate the disengagement of the fire tray from a given position on support members 14$^a$ and 14$^b$, and its movement to another vertical plane on said support members, I provide the handle members 21 and 22, joined to the fire tray at a point to the rear of a median line between the front and rear edges of the fire tray, and preferably to the rear of slots s. As shown handle members 21 and 22 are attached at the sides 11$^c$ and 11$^d$ of the fire tray, and are preferably joined thereto as by pivots 23 and 24, connecting said handles to the outwardly extending flanges in which the slots s are provided, and which, in the embodiments of the invention described above, may be either flanges f or flanges f'. The pivots 23 and 24 make it possible to rotate the handles from a position extending rearwardly from the tray, in substantially the planes of the sides of the tray, into positions in which the handles lie along the respective sides of the tray, and extend forwardly substantially in the planes of the sides of the tray, thus making the fire tray assembly into a compact unit adapted for shipping or storage.

It will thus be seen that there has been provided by this invention a method and apparatus in which the various objects hereinabove set forth together with many thoroughly practical advantages are successfully achieved. As various possible embodiments might be made of the mechanical features of the above invention and as the art herein described might be varied in various parts, all without departing from the scope of the invention, it is to be understood that all matter hereinbefore set forth or shown in the accompanying drawings is to be interpreted as illustrative and not in a limiting sense.

What I claim is:

1. A fire tray assembly comprising a U-shaped member adapted to be inserted in the earth to provide support means for a tray, and a tray having means thereon adapted to co-act with said support means to position said tray on said support means in any one of a number of different horizontal planes, and a spacing member adapted to extend between the arms of said U-shaped member and to maintain them in spaced relation.

2. A fire tray assembly comprising vertically extending support means for a tray, and a tray having means thereon adapted to co-act with said support means to position said tray on said support means in any one of a number of different horizontal planes, said means comprising outwardly extending flanges slotted to receive said supporting means and angularly related to the surface of said tray to cause said tray to lie in a substantially horizontal plane after said slots have been frictionally engaged with said support means at a desired height.

3. A fire tray assembly comprising a tray having laterally extending flanges provided with outwardly opening slots, a plurality of vertically extending members adapted to be fixed in the earth in spaced relation and adapted to enter the said slots of said fire tray, the greater portion of said fire tray extending forwardly of said slots so that when said vertically extending members are positioned in the slots of said fire tray said tray will tend to rotate forwardly with respect to said support means thereby causing the edges of said slots to frictionally engage said support means to position the tray on said support means, and handle means extending rearwardly with respect to said slots whereby said tray may be rotated rearwardly to overcome the frictional engagement between said slots and said support means and permit said tray to be adjusted in height on said support means.

4. A fire tray assembly comprising a U-shaped member adapted to be inserted in the earth to provide support means for a tray, means for spacing the legs of said U-shaped member comprising a thin intermediate portion of substantial width, and end portions twisted through 90° relative to the intermediate portion, said end portions having eyelets to receive the legs of said U-shaped member respectively, and a fire tray having outwardly projecting flanges, the said flanges having cut-outs adapted to receive the legs of said U-shaped support means respectively so that the tray in one angular position is readily movable up and down on said U-shaped member, and in another angular position of the tray is fixed in its position on said legs.

5. A fire tray assembly comprising a U-shaped support member, means slideably related to the legs of said support member adapted to maintain the legs in spaced relation, and a fire tray adapted to be mounted on said support means between the legs of said U-shaped support.

HAROLD HOWE.

REFERENCES CITED

The following references are of record in the file of this patent:

UNITED STATES PATENTS

| Number | Name | Date |
| --- | --- | --- |
| 141,498 | Edmonston | Aug. 5, 1873 |
| 485,008 | House | Oct. 25, 1892 |
| 598,862 | Donica | Feb. 8, 1898 |
| 896,384 | Hohnsbeen | Aug. 18, 1908 |
| 1,173,036 | Robidoux | Feb. 22, 1916 |
| 1,293,237 | Stovall | Feb. 4, 1919 |
| 1,536,678 | Markowski | May 5, 1925 |
| 1,666,293 | Lorton | Apr. 17, 1928 |
| 2,334,847 | Spiers | Nov. 23, 1943 |